United States Patent
Ravich et al.

(10) Patent No.: US 10,894,399 B2
(45) Date of Patent: Jan. 19, 2021

(54) SYSTEM AND METHOD FOR ADDITIVE MANUFACTURING OF AN OBJECT

(71) Applicant: Stratasys Ltd., Rehovot (IL)

(72) Inventors: Diana Ravich, Natania (IL); Eduardo Napadensky, Natania (IL)

(73) Assignee: Stratasys Ltd., Rehovot (IL)

( * ) Notice: Subject to any disclaimer, the term of this patent is extended or adjusted under 35 U.S.C. 154(b) by 358 days.

(21) Appl. No.: 15/626,219

(22) Filed: Jun. 19, 2017

(65) Prior Publication Data

US 2017/0282452 A1   Oct. 5, 2017

Related U.S. Application Data

(62) Division of application No. 13/989,802, filed as application No. PCT/IL2011/050031 on Nov. 28, 2011, now Pat. No. 9,688,021.

(60) Provisional application No. 61/417,436, filed on Nov. 28, 2010.

(51) Int. Cl.
```
B33Y 10/00      (2015.01)
B29C 64/112     (2017.01)
B29C 64/393     (2017.01)
B33Y 50/02      (2015.01)
```

(52) U.S. Cl.
CPC .......... *B33Y 10/00* (2014.12); *B29C 64/112* (2017.08); *B29C 64/393* (2017.08); *B33Y 50/02* (2014.12)

(58) Field of Classification Search
CPC ....... B33Y 10/00; B33Y 50/02; B29C 64/393; B29C 64/20; B29C 64/112
See application file for complete search history.

(56) References Cited

U.S. PATENT DOCUMENTS

| | | | |
|---|---|---|---|
| 2005/0074596 A1* | 4/2005 | Nielsen | B29C 64/40 428/304.4 |
| 2006/0054039 A1* | 3/2006 | Kritchman | B29C 41/48 101/424.1 |
| 2010/0042241 A1* | 2/2010 | Inoue | A61C 13/0004 700/97 |

(Continued)

FOREIGN PATENT DOCUMENTS

| | | |
|---|---|---|
| JP | 06-246837 | 9/1994 |
| JP | 2002-331592 | 11/2002 |

(Continued)

OTHER PUBLICATIONS

European Search Report and the European Search Opinion dated Jun. 22, 2018 From the European Patent Office Re. Application No. 18163656.4. (7 Pages).

(Continued)

*Primary Examiner* — Galen H Hauth (57) ABSTRACT

A method of additive manufacturing of a three-dimensional object is disclosed. The method comprises sequentially forming a plurality of layers in a configured pattern corresponding to the shape of the object. Each layer is formed by dispensing at least one modeling material to form an uncured layer, and curing the uncured layer by radiation. In various exemplary embodiments of the invention the method comprises, for at least one layer, forming a stack of sacrificial radiation-protective layers to cover an exposed portion of the layer, such that an upper layer of the stack remains exposed during formation of any subsequent layer of the plurality of layers.

18 Claims, 4 Drawing Sheets

(56) References Cited

U.S. PATENT DOCUMENTS

2010/0170540 A1    7/2010   Kritchman et al.
2013/0241114 A1    9/2013   Ravich et al.

FOREIGN PATENT DOCUMENTS

| JP | 2005-081563 | 3/2005 |
|----|-------------|--------|
| JP | 5841162 | 1/2016 |
| WO | WO 01/10632 | 2/2001 |
| WO | WO 2004/050323 | 6/2004 |
| WO | WO 2012/070052 | 5/2012 |

OTHER PUBLICATIONS

Communication Pursuant to Article 94(3) EPC dated Feb. 27, 2019 From the European Patent Office Re. Application No. 18163656.4. (3 Pages).
European Search Report and the European Search Opinion dated Feb. 16, 2016 From the European Patent Office Re. Application No. 15195361.9.
International Preliminary Report on Patentability dated Jun. 6, 2013 From the International Bureau of WIPO Re. Application No. PCT/IL2011/050031.
International Search Report and the Written Opinion dated May 8, 2012 From the International Searching Authority Re. Application No. PCT/IL2011/050031.
Notice of Reasons for Rejection dated Jul. 28, 2016 From the Japanese Patent Office Re. Application No. 2015-222279 and Its Translation Into English.
Notification of Office Action dated Oct. 21, 2015 From the State Intellectual Property Office of the People's Republic of China Re. Application No. 201180057148.3 and Its Translation Into English.
Notification of Office Action dated Dec. 23, 2014 From the State Intellectual Property Office of the People's Republic of China Re. Application No. 201180057148.3.
Official Action dated Dec. 6, 2016 From the US Patent and Trademark Office Re. U.S. Appl. No. 13/989,802. (12 pages).
Official Action dated Apr. 13, 2016 From the US Patent and Trademark Office Re. U.S. Appl. No. 13/989,802.
Restriction Official Action dated Jan. 13, 2016 From the US Patent and Trademark Office Re. U.S. Appl. No. 13/989,802.
Translation Dated Jan. 29, 2015 of Notification of Office Action dated Dec. 23, 2014 From the State Intellectual Property Office of the People's Republic of China Re. Application No. 201180057148. 3.

\* cited by examiner

SYSTEM AND METHOD FOR ADDITIVE MANUFACTURING OF AN OBJECT

RELATED APPLICATIONS

This application is a division of U.S. patent application Ser. No. 13/989,802 filed on May 27, 2013 which is a National Phase of PCT Patent Application No. PCT/IL2011/050031 having International Filing Date of Nov. 28, 2011, which claims the benefit of priority under 35 USC § 119(e) of U.S. Provisional Patent Application No. 61/417,436 filed on Nov. 28, 2010. The contents of the above applications are all incorporated by reference as if fully set forth herein in their entirety.

FIELD AND BACKGROUND OF THE INVENTION

The present invention, in some embodiments thereof, relates to Additive Manufacturing (AM) of an object, more particularly, but not exclusively, to a system and method for additive manufacturing of an object while reducing curing-induced discoloration of the object or part of the object.

Additive manufacturing is generally a process in which a three-dimensional (3D) object is manufactured utilizing a computer model of the objects. Such a process is used in various fields, such as design related fields for purposes of visualization, demonstration and mechanical prototyping, as well as for rapid manufacturing (RM).

The basic operation of any AM system consists of slicing a three-dimensional computer model into thin cross sections, translating the result into two-dimensional position data and feeding the data to control equipment which manufacture a three-dimensional structure in a layerwise manner.

Additive manufacturing entails many different approaches to the method of fabrication, including three-dimensional printing, laminated object manufacturing, fused deposition modeling and others.

In three-dimensional printing processes, for example, a building material is dispensed from a dispensing head having a set of nozzles to deposit layers on a supporting structure. Depending on the building material, the layers may then be cured or solidified using a suitable device. The building material may include modeling material, which forms the object, and support material, which supports the object as it is being built. Various three-dimensional printing techniques exist and are disclosed in, e.g., U.S. Pat. Nos. 6,259,962, 6,569,373, 6,658,314, 6,850,334, 7,183,335 7,209,797, 7,225,045, 7,300,619, 7,479,510, 7,500,846, 7,658,976 and 7,962,237, and U.S. Published Application No. 20100191360, all of the same Assignee, the contents of which are hereby incorporated by reference.

AM facilitates rapid fabrication of functioning prototypes with minimal investment in tooling and labor. Such rapid prototyping shortens the product development cycle and improves the design process by providing rapid and effective feedback to the designer. AM can also be used for rapid fabrication of non-functional parts, e.g., for the purpose of assessing various aspects of a design such as aesthetics, fit, assembly and the like. Additionally, AM techniques have been proven to be useful in the fields of medicine, where expected outcomes are modeled prior to performing procedures. It is recognized that many other areas can benefit from rapid prototyping technology, including, without limitation, the fields of architecture, dentistry and plastic surgery where the visualization of a particular design and/or function is useful.

Several AM techniques allow additive formation of objects using more than one modeling material. For example, U.S. Published Application No. 20100191360 of the present Assignee, the contents of which are hereby incorporated by reference, discloses a system which comprises an additive manufacturing apparatus having a plurality of dispensing heads, a building material supply apparatus configured to supply a plurality of building materials to the fabrication apparatus, and a control unit configured for controlling the fabrication and supply apparatus. The system has several operation modes. In one mode, all dispensing heads operate during a single building scan cycle of the fabrication apparatus. In another mode, one or more of the dispensing heads is not operative during a single building scan cycle or part thereof.

SUMMARY OF THE INVENTION

According to an aspect of some embodiments of the present invention there is provided a method of additive manufacturing of a three-dimensional object. The method comprises sequentially forming a plurality of layers in a configured pattern corresponding to the shape of the object. Each layer is formed by dispensing at least one modeling material to form an uncured layer, and curing the uncured layer by radiation. In various exemplary embodiments of the invention the method comprises, for at least one layer, forming a stack of sacrificial radiation-protective layers to cover an exposed portion of the layer, such that an upper layer of the stack remains exposed during formation of any subsequent layer of the plurality of layers.

According to some embodiments of the invention the invention the method comprises removing the stack.

According to some embodiments of the invention the stack is removed by a jet of pressurized aqueous liquid.

According to some embodiments of the invention the number of layers in the stack is selected so as to block at least 90% of the radiation.

According to some embodiments of the invention the method comprises forming a plurality of the stacks, wherein each stack has at least 10 layers.

According to some embodiments of the invention the sacrificial radiation-protective layers are made, at least in part, from a three-dimensional printing support material.

According to some embodiments of the invention the sacrificial radiation-protective layers are made, at least in part, from a water soluble material.

According to some embodiments of the invention the sacrificial radiation-protective layers are characterized by a modulus of elasticity which is lower than a modulus of elasticity characterizing the modeling material once cured.

According to some embodiments of the invention the sacrificial radiation-protective layers comprise unpolymerizable material.

According to an aspect of some embodiments of the present invention there is provided a computer software product, comprising a computer-readable medium in which program instructions are stored, which instructions, when read by a computerized controller of an additive manufacturing system, cause the system to execute at least some operations of the method described herein.

According to an aspect of some embodiments of the present invention there is provided a system for additive manufacturing of a three-dimensional object. The system comprises; a dispensing unit configured for dispensing at least one type of modeling material to form an uncured layer; a curing unit configured for curing the uncured layer by radiation; and a controller configured for operating the dispensing unit and the curing unit to sequentially form a plurality of layers in a configured pattern corresponding to the shape of the three-dimensional object, and a stack of radiation-protective layers covering an exposed portion of at least one layer, such that an upper layer of the stack remains exposed during formation of any subsequent layer of the plurality of layers.

According to some embodiments of the invention the number of layers in the stack is selected so as to block at least 90% of the radiation.

According to some embodiments of the invention there is a plurality of the stacks, wherein each stack has at least 10 layers. According to some embodiments of the invention each stack has at least 100 layers.

According to some embodiments of the invention the stack is selected such as to form an object which is generally uniform in color.

According to some embodiments of the invention the stack is selected such as to form an object which is generally uniform in lack of color.

According to some embodiments of the invention the controller is configured for calculating at least one of a thickness and a number of layers in the stack based on a type of a radiation-protective material used for forming the stack.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to Additive Manufacturing (AM) of an object, more particularly, but not exclusively, to a system and method for additive manufacturing of an object while reducing curing-induced discoloration.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects in a layerwise manner by forming a plurality of layers in a configured pattern corresponding to the shape of the objects.

The term "object" as used herein refers to a whole object or a part thereof.

Each layer is formed by additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

In some embodiments of the present invention the AM comprises three-dimensional printing. In these embodiments a building material is dispensed from a dispensing head having a set of nozzles to deposit building material in layers on a supporting structure. The AM apparatus thus dispenses building material in target locations which are to be occupied and leaves other target locations void. The apparatus typically includes a plurality of dispensing heads, each of which can be configured to dispense a different building material. Thus, different target locations can be occupied by different building materials. The types of building materials can be categorized into two major categories: modeling material and support material. The support material serves as a supporting matrix or construction for supporting the object or object parts during the fabrication process and/or other purposes, e.g., providing hollow or porous objects. Support constructions may additionally include modeling material elements, e.g. for further support strength.

The modeling material is generally a composition which is formulated for use in Additive manufacturing and which is able to form a three-dimensional object on its own, i.e., without having to be mixed or combined with any other substance.

The final three-dimensional object is made of the modeling material or a combination of modeling and support material or modification thereof (e.g., following curing). All these operations are well-known to those skilled in the art of solid freeform fabrication.

In some exemplary embodiments of the invention an object is manufactured by dispensing two or more different modeling materials, each material from a different dispensing head of the AM. The materials are optionally and preferably deposited in layers during the same pass of the printing heads. The materials and combination of materials within the layer are selected according to the desired properties of the object.

Figure 1A:
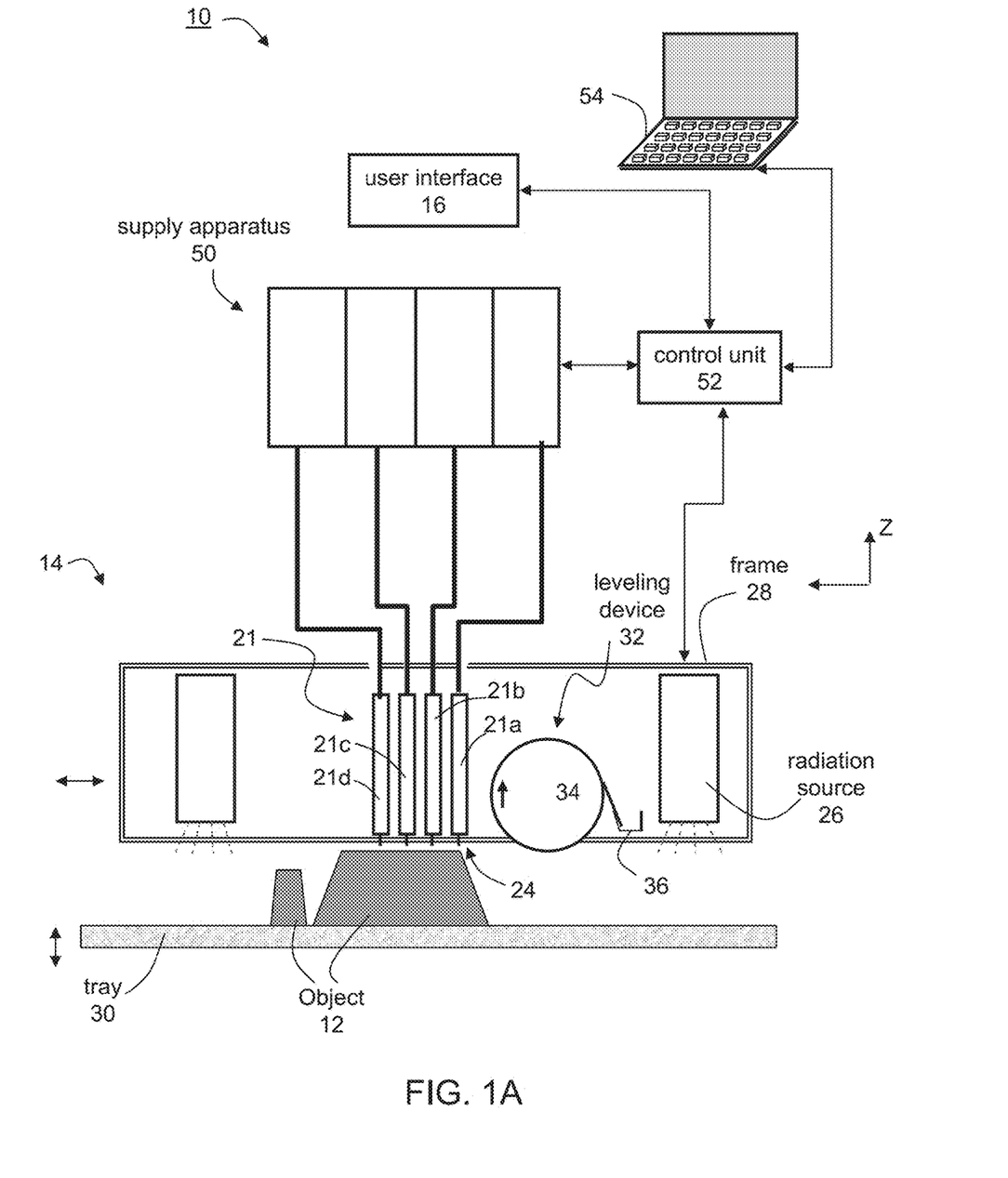
FIGS. 1A and 1B are schematic illustration of an additive manufacturing system according to some embodiments of the present invention.
Figure 1B:
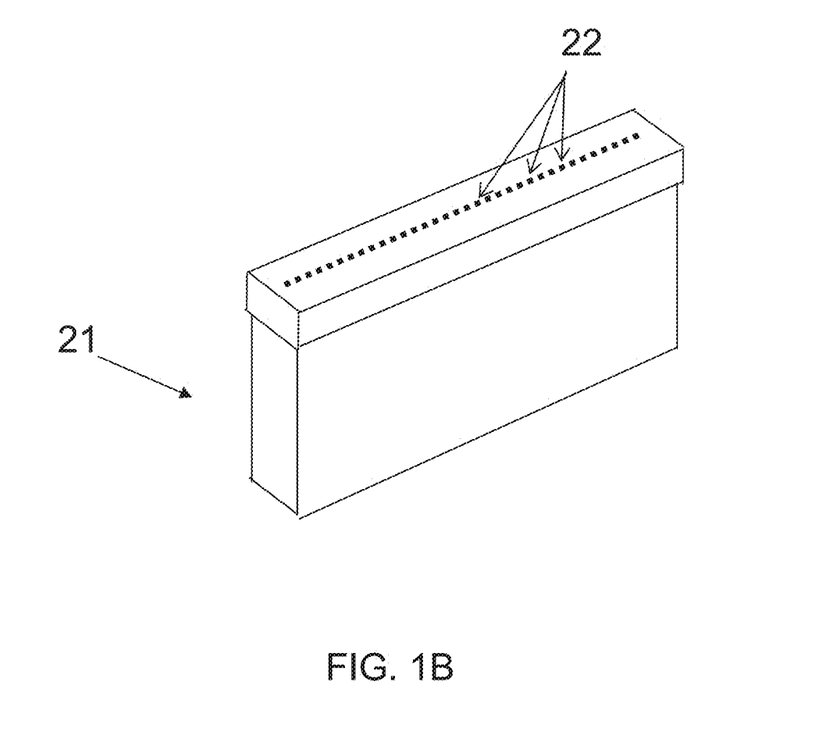

A representative and non-limiting example of a system 10 suitable for AM of an object 12 according to some embodiments of the present invention is illustrated in FIGS. 1A-1B. System 10 comprises an additive manufacturing apparatus 14 having a dispensing unit 21 which comprises a plurality of dispensing heads. Each head preferably comprises an array of one or more nozzles 22, as illustrated in FIG. 1B, through which a building material 24 is dispensed.

Preferably, but not obligatorily, apparatus 14 is a three-dimensional printing apparatus, in which case the dispensing heads are printing heads, and the building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, binder jet—powder-based apparatus, fused deposition modeling apparatus and fused material deposition apparatus.

Each dispensing head is optionally and preferably fed via a building material reservoir which may optionally include a temperature control unit (e.g., a temperature sensor and/or a heating device), and a material level sensor. To dispense the building material, a voltage signal is applied to the dispensing heads to selectively deposit droplets of material via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 1A, four dispensing heads 21a, 21b, 21c and 21d are illustrated. Each of heads 21a, 21b, 21c and 21d has a nozzle array. In this Example, heads 21a and 21b can be designated for modeling material/s and heads 21c and 21d can be designated for support material. Thus, head 21a can dispense a first modeling material, head 21b can dispense a second modeling material and heads 21c and 21d can both dispense support material. In an alternative embodiment, heads 21c and 21d, for example, may be combined in a single head having two nozzle arrays for depositing support material.

Yet it is to be understood that it is not intended to limit the scope of the present invention and that the number of modeling material depositing heads (modeling heads) and the number of support material depositing heads (support heads) may differ. Generally, the number of modeling heads, the number of support heads and the number of nozzles in each respective head or head array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material equals the height of support material. Typical values for a are from about 0.6 to about 1.5.

As used herein the term "about" refers to ±10%.

For example, for a=1, the overall dispensing rate of support material is generally the same as the overall dispensing rate of the modeling material when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 14 can further comprise a curing unit which can comprise one or more radiation sources 26, which can be, for example, an ultraviolet or visible or infrared lamp, or other sources of electromagnetic radiation, or electron beam source, depending on the modeling material being used. Radiation source 26 serves for curing or solidifying the modeling material.

The dispensing head and radiation source are preferably mounted in a frame or block 28 which is preferably operative to reciprocally move over a tray 30, which serves as the working surface. According to the common conventions, tray 30 is positioned in the X-Y plane. Tray 30 is preferably configured to move vertically (along the Z direction), typically downward. In various exemplary embodiments of the invention, apparatus 14 further comprises one or more leveling devices 32, e.g. a roller 34. Leveling device 32 serves to straighten, level and/or establish a thickness of the newly formed layer prior to the formation of the successive layer thereon. Leveling device 32 preferably comprises a waste collection device 36 for collecting the excess material generated during leveling. Waste collection device 36 may comprise any mechanism that delivers the material to a waste tank or waste cartridge.

In use, the dispensing heads of unit 21 move in a scanning direction, which is referred to herein as the X direction, and selectively dispense building material in a predetermined configuration in the course of their passage over tray 30. The building material typically comprises one or more types of support material and one or more types of modeling material. The passage of the dispensing heads of unit 21 is followed by the curing of the modeling material(s) by radiation source 26. In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 32, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 30 is lowered in the Z direction to a predetermined Z level, according to the desired thickness of the layer subsequently to be printed. The procedure is repeated to form three-dimensional object 12 in a layerwise manner.

In another embodiment, tray 30 may be displaced in the Z direction between forward and reverse passages of the dispensing head of unit 21, within the layer. Such Z displacement is carried out in order to cause contact of the leveling device with the surface in one direction and prevent contact in the other direction.

System 10 optionally and preferably comprises a building material supply apparatus 50 which comprises the building material containers or cartridges and supplies a plurality of building materials to fabrication apparatus 14.

A control unit 52 controls fabrication apparatus 14 and optionally and preferably also supply apparatus 50. Control unit 52 preferably communicates with a data processor 54 which transmits digital data pertaining to fabrication instructions based on computer object data, e.g., a CAD configuration represented on a computer readable medium in a form of a Standard Tessellation Language (STL) format or the like. Typically, control unit 52 controls the voltage applied to each dispensing head or nozzle array and the temperature of the building material in the respective printing head.

Once the manufacturing data is loaded to control unit 52 it can operate without user intervention. In some embodiments, control unit 52 receives additional input from the operator, e.g., using data processor 54 or using a user interface 16 communicating with unit 52. User interface 16 can be of any type known in the art, such as, but not limited to, a keyboard, a touch screen and the like. For example, control unit 52 can receive, as additional input, one or more building material types and/or attributes, such as, but not limited to, color, characteristic distortion and/or transition temperature, viscosity, electrical property, magnetic property. Other attributes and groups of attributes are also contemplated.

Some embodiments contemplate the fabrication of an object by dispensing different materials from different dispensing heads. These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

The present embodiments thus enable the deposition of a broad range of material combinations, and the fabrication of an object which may consist of multiple different combinations of materials, in different parts of the object, according to the properties desired to characterize each part of the object.

Further details on the principles and operations of an AM system such as system 10 is found in U.S. Published Application No. 20100191360, the contents of which are hereby incorporated by reference.

Typically, dispensing unit 21 scans tray 30 in several passes. This operation is applied when the width of dispensing unit 21 is smaller than the width of tray 30 and/or when several objects are built on the same tray during a single additive manufacturing batch.

Figure 2A:
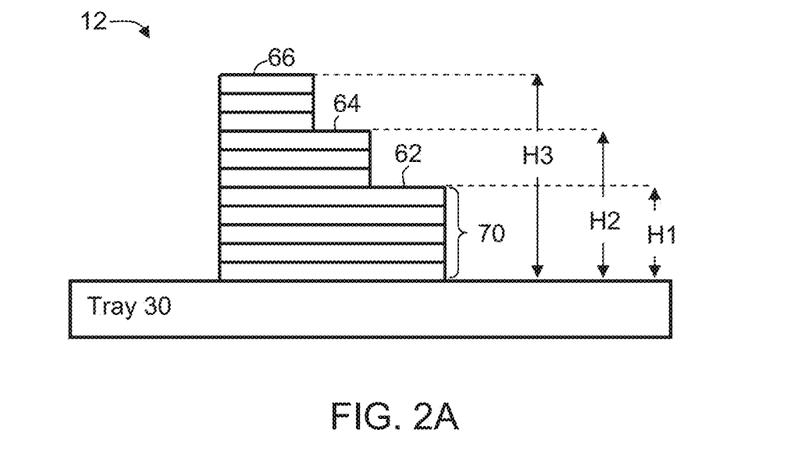
FIGS. 2A and 2B are schematic illustrations of an object having regions of different heights.

When object 12 comprises regions having varying heights, higher regions of the object being printed require more layers of modeling material than lower regions. A representative situation is illustrated in FIG. 2A. Shown in FIG. 2A is object 12 in an embodiment in which the object includes a region 62 of height H1, a region 64 of height H2, and a region 66 of height H3, where H1<H2<H3. The layers 70 are shared by all three regions 62, 64 and 66.

Since object 12 is formed in a layerwise manner from bottom to top, during the formation of the layers above height H1, the uppermost layer of region 62 remains exposed, and during the formation of layers above height H2, both the uppermost layer of region 62 and the uppermost layer of region 64 remain exposed, while the dispensing unit 21 continues the scan process of dispensing and curing each of the layers above heights H1 and H2, respectively. Due to their prolonged exposure, the aggregate amount of curing radiation for these uppermost layers is larger than for any other layer. It was found by the present inventors that such over curing results in discoloring of at least the uppermost layers of the exposed lower height region or regions (regions 62 and 64 in the present example). The discoloration effect can also extend to layers below the uppermost layer due to penetration of the curing radiation through the modeling material. The situation is illustrated in FIG. 2B, showing a discoloration over the exposed parts of the two uppermost layers 72 of region 62, and the two uppermost layers 74 of region 64.

One form of discoloration of the modeling material due to over-curing is an undesired coloration of exposed areas, i.e. layers or parts of layers in exposed areas compared to that in the unexposed areas of the objects being formed.

Over-curing alternatively produces another form of discoloration of the modeling material, where overexposure causes the material to take on a yellowish hue, thus producing regions of yellowed material where the material is over-exposed to radiation, compared to areas which are not subject to the effects of over-radiation.

Figure 2B:
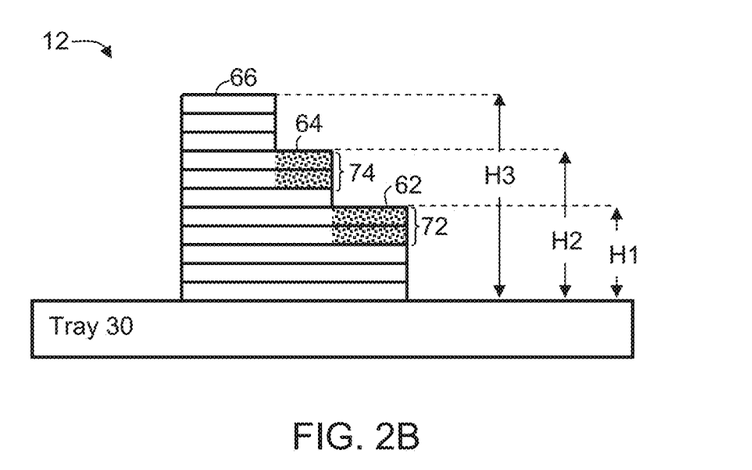

For example, when printing the object depicted in FIG. 2B using a building material having the trade name Objet® VeroWhite RGD830 (Objet Ltd., Israel), a white opaque material when cured, over-curing causes a yellowing or browning of the upper exposed layer parts 72 and 74, while the remainder of the object is a white opaque color.

In another example, when printing the object depicted in FIG. 2B using a building material having the trade name Objet® VeroClear RGD810 (Objet Ltd., Israel), a virtually colorless transparent material when cured, over-curing causes a yellowing or browning of the material at layer parts 72 and 74, which is visible through the colorless transparent material, while the remainder of the object is virtually colorless and transparent throughout.

The same yellowing or browning due to over-curing may occur in other colored, opaque materials, or colored, transparent materials, for example the building materials having the trade names Objet® FullCure® 720 RGD720, Objet® VeroGray RGD850, and other modeling materials.

Figure 3:
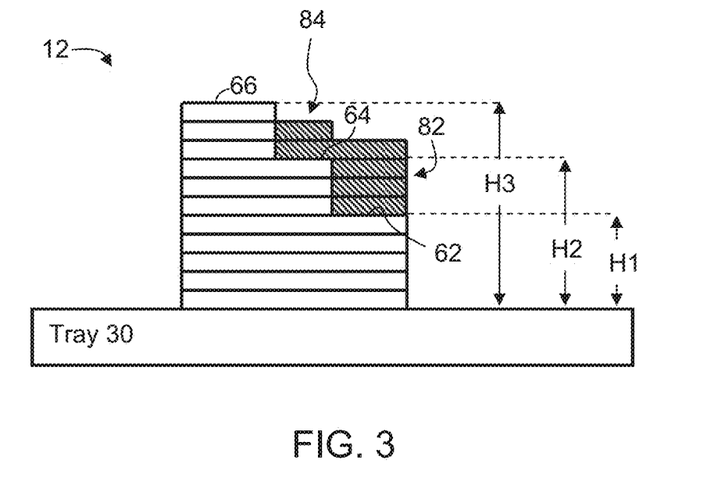
FIG. 3 is a schematic illustration exemplifying the formation of a stack of radiation-protective layers during manufacturing of an object having regions of different heights.

The present inventors have devised a technique which reduces or prevents curing-induced discoloration. The methods of the present embodiments thus provide an object which is uniform in coloration throughout the object. In various exemplary embodiments of the invention control unit 52 operates dispensing unit 21 to form a stack of radiation-protective layers covering the exposed portion of one or more of the layers (e.g., regions 62 and 64 in the above example). A schematic illustration of these embodiments is illustrated in FIG. 3. As shown, regions 62 and 64 at heights H1 and H2, respectively, are covered by stacks generally shown at 82 and 84. The stacks are made from a material with sufficiently high absorption or reflection coefficient to the wavelength of the curing radiation applied by radiation source 26.

The stacks are optionally and preferably formed by dispensing unit 21 during the buildup of object 12, at the same time as layers of the object being formed at the same height. Thus In these embodiments, the part of the layer for forming the object and the radiation-protective part of the layer are made in the same scan of the dispensing heads. For example, the lowermost layer of stack 82 is formed when the z level of tray 30 is adjusted for the layer immediately above (e.g., on top of) the uppermost layer of region 62. Thus, the amount of radiation arriving to the low heights regions of the object (regions 62 and 64 in the present example) is gradually reduced during and as a result of the buildup of the stacks.

In various exemplary embodiments of the invention at least one of the stacks is not covered by modeling material layers from above. In other words, such a stack of radiation-protective layers can be covered by additional radiation-protective layers but is preferably not covered by a modeling material layer. Thus, during the formation of any modeling material layer subsequent to i.e. higher than the uppermost layer of the low height region(s) of object 12, the uppermost layer of the low height region(s), being the uppermost layer of the protective stack is exposed and protects the modeling material layers beneath it from the effects of excess curing. Once the uppermost layer of the stack is formed, it remains exposed until object 12 is completed.

The overall height or the number of radiation-protective layers is optionally and preferably selected by control unit 52 based on the type of radiation-protective material which is used for forming the stack. For example, materials with strong radiation absorption, can provide shielding from the radiation with fewer layers (e.g., one layer), while for materials with lower radiation absorption, a larger number of layers is preferred. In some embodiments of the present invention the number of layers in the stack is selected so as to block at least 90% or at least 93% or at least 96% or at least 99% of the curing radiation emitted by source 26. Typically, the number of layers in the stack is at least 10 (e.g., more than 10) layers, or at least 30 (e.g., more than 30) layers, or at least 60 (e.g., more than 60) layers, or at least 90 (e.g., more than 90) layers, for example, 100 layers or more.

Typically, but not necessarily, the respective layer has a thickness which is about 15 microns. In some embodiments, the respective layer has a thickness of at least 5 microns, e.g., about 5 microns, or about 10 microns, or about 15 microns or about 30 microns. Other thicknesses are not excluded from the scope of the present invention.

In some embodiments of the present invention the controller calculates at least one of a thickness and a number of layers in the stack based on a type of a radiation-protective material used for forming the stack. Optionally and preferably the thickness and/or number of layers is calculated based on the transmission coefficient of the radiation-protective material for the curing radiation. The calculation can be by a preprogrammed analytical function, or via a lookup table which can be stored, for example, in a memory medium accessible by the controller.

In some embodiments of the present invention a plurality of stacks is formed, wherein the number of layers of two or more of these stacks is as indicated above. The radiation-protective layers are sacrificial layers. That is, they are deposited during the build up of object 12 but they are not part of the objects itself. Once the object is completed, the stack can be removed using any technique that selectively removes the radiation-protective layers generally without damaging the modeling material layers.

Figure 4A:
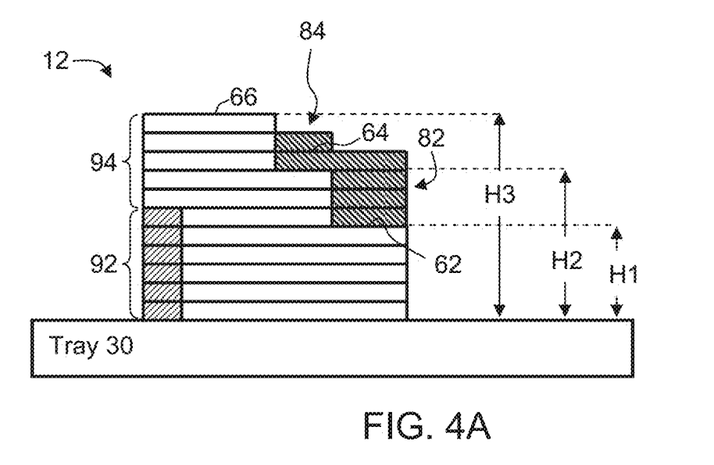
FIGS. 4A and 4B are schematic illustrations exemplifying the formation of a stack of radiation-protective layers and support layers during manufacturing of an object having regions of different heights and an overhang feature.
Figure 4B:
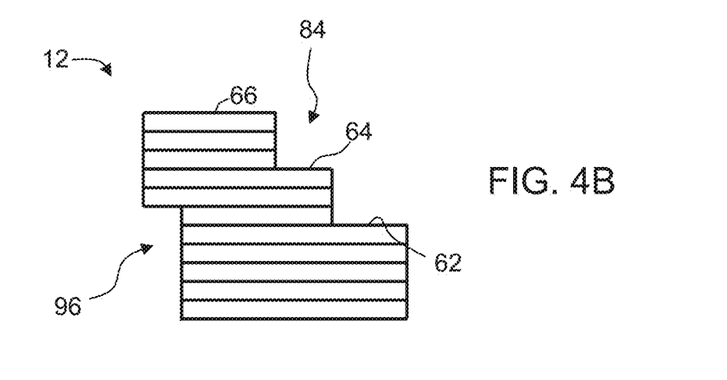

It is recognized that during the additive manufacturing of the object additional sacrificial layers can be formed. A representative example of such a configuration is illustrated in FIGS. 4A and 4B. FIG. 4A illustrates a configuration which includes, in addition to protective stacks 82 and 84, several support layers 92 formed for supporting the upper layers 94 of object 12 while upper layers 94 are being formed. Such support layers are made of support material, optionally including also modeling material elements for reinforcement, and are also sacrificial since they are not part of the final object. Once the object is completed all sacrificial layers are removed, leaving only the modeling material layers. The removal of the protective stacks 82 and 84, reveals the low-height regions 62 and 64, and the removal of support layers 92 reveals a void or recess 96 beneath upper layers 94 which form an overhang above recess 96.

The difference between the two types of sacrificial layers, is that while the uppermost layer of support layers 92 is eventually covered by the bottommost layer of modeling layers 94, the uppermost layers of stacks 82 and 84 preferably remain exposed once the buildup of object 12 is completed. In some embodiments of the present invention the number of layers in the stack is larger than the number of layers in any of the support regions 92. In some embodiments of the present invention the number of layers in the stack is less than the number of layers in any of the support regions 92.

In various exemplary embodiments of the invention, for at least 50% of the layers or at least 60% of the layers or at least 70% of the layers or at least 80% of the layers or at least 90% of the layers e.g., all the layers of the stack, the dimensions of the layer are more than 1.7 mm or more than 1.8 mm or more than 1.9 mm or more than 2 mm in at least one of the X direction or the Y direction. In some embodiments of the present invention, the dimensions of the layer are more than 2 mm by 2 mm.

In an aspect of some embodiments of the present invention there is provided a method suitable for additive manufacturing of a three-dimensional object. The method can be executed using an AM system, e.g., system 10. The method comprises sequentially forming a plurality of layers in a configured pattern corresponding to the shape of the object. The formation of each layer comprises dispensing at least one modeling material to form an uncured layer, and curing uncured layer by radiation, as further detailed hereinabove. For at least one of the layers, the method forms a stack of sacrificial radiation-protective layers to cover an exposed portion of that layer, as further detailed hereinabove. In some embodiments of the present invention the method removes the stack once the object buildup is completed.

The radiation-protective layers of the stacks can be made from any material which is suitable for additive manufacturing (e.g., three-dimensional printing) and which has a sufficiently high absorption or reflection coefficient to the wavelength of the curing radiation applied by radiation source 26. In various exemplary embodiments of the invention the radiation-protective layers are removable so as to allow them to be detached from the modeling layers following manufacturing.

It was surprisingly found by the present inventors that support materials which have traditionally been used for forming supporting layers beneath overhangs or curved object features, have adequate radiation absorption coefficient for use as radiation-protective layers above low-height regions of the object. In experiments performed by the present inventors stacks of layers made of support material, optionally including also modeling material elements for reinforcement, unexpectedly prevented the effects of discoloration in the low-height regions.

In some embodiments of the present invention the radiation-protective layers are made, at least in part, from a water soluble support material. This allows removal of the sacrificial layers using water or other aqueous liquid. For example, a jet of pressurized aqueous liquid (e.g., water) can be directed to the object, so as to selectively remove the sacrificial layers while maintaining the modeling layers intact and undamaged.

In some embodiments of the present invention the radiation-protective layers are characterized by a modulus of elasticity which is lower than a modulus of elasticity characterizing the modeling material once cured. Radiation-protective layers of reduced modulus of elasticity are advantageous from the standpoint of removal procedure. When the radiation-protective layers have a lower modulus of elasticity than the modeling layers, they can be easily detached from the modeling layers by wet or dry mechanical treatment, wherein the elasticity of the modeling layers prevents the modeling layer from being damaged by the treatment. Representative examples of mechanical treatment including, without limitation, dry peeling and use of liquid jets.

In some embodiments of the present invention the radiation-protective layers are made of a material which comprises a combination of an unpolymerizable component and a polymerizable component. Such material in addition can optionally form a very thin separation region between the radiation-protective layers and the modeling layers when deposited alone, e.g., without reinforcing modeling material elements, at the interface between the two layer part types (objet layer part and protective layer part) during layer formation. Such thin separation facilitates removal of the protective layer stack from the object and is likewise removed from the object, after completion of the manufacturing process. Preferably, the material of the radiation-protective layers contains at least 50% weight of unpolymerizable component.

In various exemplary embodiments of the invention the material of the radiation-protective layers has a sufficiently low oxygen solubility so as to allow the protective covering layers to reduce or protect from oxygen penetration.

A representative example of a material suitable for forming the radiation-protective layers of the present embodiments is a three-dimensional printing support material, such as, but not limited to, FullCure® 705 marketed by Objet Ltd. Optionally and preferably, the support material is mixed with a certain amount (e.g., 25% weight) of modeling material.

In some embodiments, the method and/or system manufactures an object which is generally uniform in color. In some embodiments, the method and/or system manufactures an object which is generally uniform in lack of color.

The uniformity in color or lack of color can be measured, for example, using a spectrophotometer. A suitable spectrophotometer is, for example, X-Rite SP62, (X-Rite, USA). This technique is particularly useful for colored objects. Another technique includes use of digital imaging for acquiring an image of the object. A suitable digital camera is, for example, Canon Powershot A650 IS, Canon USA, Inc. This technique is particularly useful for transparent objects.

A yellow index can be calculated, for example, according to the equation:

Yellow Index=100−Blue/[(Blue+$Red$+Green)/3]*100, where, Blue, Red, Green are the intensities of respective colors obtained. The values of the Blue, Red and Green intensities can be obtained using any image processing algorithm known in the art. A representative example of such an algorithm is ImageJ software, which is a Java-based image processing program (National Institute of Health, USA).

The yellow index can be used as a color uniformity descriptor, wherein values which are greater than 0 correspond to a color which is more yellow, and values which are less than 0 correspond to a color which is more blue. In various exemplary embodiments of the invention the object formed by the method and system of the present embodiments is characterized by a yellow index which is from about −1 to about 3.3, or from about −1 to about 2, or from about −1 to about 1, or from about −0.5 to about 0.5, or from about −0.1 to about 0.1, e.g., 0.

One or more operations of the method of the present embodiments is implemented by a computer. Computer programs implementing the method of the present embodiments can commonly be distributed to users on a distribution medium such as, but not limited to, a floppy disk, a CD-ROM, a flash memory device and a portable hard drive. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The computer implemented method of the present embodiments can be embodied in many forms. For example, it can be embodied in on a tangible medium such as a computer for performing the method operations. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

It is expected that during the life of a patent maturing from this application many relevant modeling materials for AM will be developed and the scope of the term modeling material is intended to include all such new technologies a priori.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for additive manufacturing of a three-dimensional object having a plurality of regions at different heights, the system comprising;
   a dispensing head configured for dispensing at least one type of modeling material to form an uncured layer;
   a curing unit having a radiation source configured for curing said uncured layer by radiation; and
   a controller having a circuit configured to operate said dispensing head and said curing unit to sequentially form a plurality of layers of modeling material in a configured pattern corresponding to the shape of the three-dimensional object, and a stack of at least 10 sacrificial radiation-protective layers covering a topmost layer of each of the plurality of regions, such that an upper layer of said stack remains exposed during formation of any subsequent layer of said plurality of layers of modeling material, wherein each sacrificial radiation-protective layer is at least 5 microns in thickness.

2. The system according to claim 1, wherein a number of layers in said stack is selected so as to block at least 90% of said radiation.

3. The system according to claim 1, wherein each stack has at least 30 layers.

4. The system according to claim 1, wherein each stack has at least 60 layers.

5. The system according to claim 1, wherein each stack has at least 90 layers.

6. The system according to claim 1, wherein each layer in said stack is at least 10 microns in thickness.

7. The system according to claim 1, wherein each layer in said stack is at least 15 microns in thickness.

8. The system according to claim 1, wherein each layer in said stack is at least 30 microns in thickness.

9. The system according to claim 1, wherein said controller is configured for operating said dispensing head and said curing unit to form a plurality of stacks of sacrificial radiation-protective layers.

10. The system according to claim 1, wherein said sacrificial radiation-protective layers are made, at least in part, from a three-dimensional printing support material.

11. The system according to claim 1, wherein said sacrificial radiation-protective layers are made, at least in part, from a water soluble material.

12. The system according to claim 1, wherein said sacrificial radiation-protective layers are characterized by a modulus of elasticity which is lower than a modulus of elasticity characterizing said modeling material once cured.

13. The system according to claim 1, wherein said sacrificial radiation-protective layers comprise unpolymerizable material.

14. The system according to claim 1, wherein said stack is selected such as to form an object which is generally uniform in color.

15. The system according to claim 1, wherein said stack is selected such as to form an object which is generally uniform in lack of color.

16. The system according to claim 1, wherein said controller is configured for calculating a thickness of said stack based on a type of a radiation-protective material used for forming said stack.

17. The system according to claim 1, wherein said controller is configured for calculating a number of layers in said stack based on a type of a radiation-protective material used for forming said stack.

18. A computer software product, comprising a computer-readable medium in which program instructions are stored, which instructions, when read by a computerized controller of an additive manufacturing system having a dispensing head and a curing unit having a radiation source, cause said controller to operate said dispensing head and said curing unit to sequentially form a plurality of layers of modeling material in a configured pattern corresponding to the shape of a three-dimensional object for additive manufacturing of a three-dimensional object having a plurality of regions at different heights, and a stack of at least 10 sacrificial radiation-protective layers covering a topmost layer of each of the plurality of regions, such that an upper layer of said stack remains exposed during formation of any subsequent layer of said plurality of layers of modeling material, wherein each sacrificial radiation-protective layer is at least 5 microns in thickness.

* * * * *